United States Patent
DeLuca et al.

(10) Patent No.: US 11,475,507 B2
(45) Date of Patent: Oct. 18, 2022

(54) PRIORITIZING BOPIS ORDER FULFILLMENT

(71) Applicant: International Business Machines Corporation, Armonk, NY (US)

(72) Inventors: Lisa Seacat DeLuca, Baltimore, MD (US); John Kaufmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 16/849,542

(22) Filed: Apr. 15, 2020

(65) Prior Publication Data

US 2021/0326966 A1 Oct. 21, 2021

(51) Int. Cl.
*G06Q 10/08* (2012.01)
*G06Q 30/06* (2012.01)

(52) U.S. Cl.
CPC ....... *G06Q 30/0637* (2013.01); *G06Q 10/087* (2013.01); *G06Q 10/0836* (2013.01); *G06Q 30/0635* (2013.01)

(58) Field of Classification Search
CPC ........ G06Q 10/08–087; G06Q 30/0601–0643; G06Q 50/12
See application file for complete search history.

(56) References Cited

U.S. PATENT DOCUMENTS

| | | | |
|---|---|---|---|
| 9,896,315 B2 | 2/2018 | High et al. | |
| 9,904,952 B2 | 2/2018 | Nair et al. | |
| 10,049,401 B2 | 8/2018 | Nair et al. | |
| 10,346,784 B1 | 7/2019 | Powell et al. | |
| 10,351,399 B2 | 7/2019 | High et al. | |
| 10,354,281 B2 | 7/2019 | Deshpande et al. | |
| 10,769,712 B1* | 9/2020 | Edwards | G06Q 30/0635 |
| 10,997,645 B1* | 5/2021 | Philbin | G01S 19/52 |
| 2005/0055260 A1* | 3/2005 | Yamamoto | G06Q 10/087 |
| | | | 705/7.26 |

(Continued)

OTHER PUBLICATIONS

Anonymous, "Method and System for Optimizing Fulfillment of Online Orders to Reduce Product Markdowns at a Physical Store", ip.com, IP.com No. IPCOM000257819D (2019).

(Continued)

*Primary Examiner* — William J Allen
(74) *Attorney, Agent, or Firm* — Christopher M. Pignato

(57) ABSTRACT

Buy-online pickup-in-store (BOPIS) order fulfillment is optimized by prioritizing BOPIS orders according to estimated pickup times. The pickup time for a given order is based on a customer profile and order details which can include product properties for a product in the order, characteristics of the physical store, and an order velocity indicative of an urgency of the customer in placing the order. The pickup times are estimated by a cognitive system trained with input samples comprised of historical BOPIS orders associated with actual pickup delays. The customer profiles include historical information regarding previous BOPIS orders from the customer such as a percentage of previous BOPIS orders actually picked up, and an average pickup delay for the previous BOPIS orders that were picked up. If any order pickup time is less than a predefined threshold, the system notifies the store associate with a warning that it is urgent.

17 Claims, 6 Drawing Sheets

(56) References Cited

U.S. PATENT DOCUMENTS

| | | | | |
|---|---|---|---|---|
| 2013/0346237 | A1* | 12/2013 | Rademaker | G06Q 10/0836 |
| | | | | 705/26.8 |
| 2014/0278466 | A1* | 9/2014 | Simmons | G16H 20/10 |
| | | | | 705/2 |
| 2014/0279294 | A1 | 9/2014 | Field-Darragh et al. | |
| 2015/0310536 | A1 | 10/2015 | Brady et al. | |
| 2016/0078571 | A1* | 3/2016 | Singh | G06Q 30/0641 |
| | | | | 705/14.66 |
| 2016/0092969 | A1* | 3/2016 | Gopalsamy | G06Q 30/0635 |
| | | | | 705/26.81 |
| 2017/0011449 | A1 | 1/2017 | Mueller et al. | |
| 2017/0372394 | A1 | 12/2017 | Jones et al. | |
| 2018/0134492 | A1 | 5/2018 | Lert, Jr. | |
| 2018/0285960 | A1* | 10/2018 | Li | G06Q 30/0635 |
| 2020/0320474 | A1* | 10/2020 | Hong | G06F 3/0482 |

OTHER PUBLICATIONS

Cuartero, Jeffrey, "Prioritizing order fulfillment to optimize delivery costs" [online], Technical Disclosure Commons, retrieved on Feb. 25, 2020 from the Internet URL: http://www.tdcommons.org/dpubs_series/738 (2017).

Curbside, "Online Commerce for Physical Stores with All the Key Features" [online], retrieved on Feb. 25, 2020 from the Internet URL: https://curbside.com/features/analytics/ (2019).

Forrester, "Customer Desires Vs. Retailer Capabilities: Minding the Omni-Channel Commerce Gap", Forrester Research, Inc., retrieved on Apr. 15, 2020 from the Internet URL: https://www.accenture.com/us-en/~/media/accenture/conversion-assets/dotcom/documents/global/pdf/technology_7/accenture-customer-desires-vs-retailer-capabilities.pdf (2014).

Galling, Santiago, et al., "Integration of Online and Offline Channels in Retail: The Impact of Sharing Reliable Inventory Availability Information", Management Science, v. 60, n. 6 (2012).

IBM, "Method and Apparatus for Online Shopping with In Store Pickup and Payment", ip.com, IP.com No. IPCOM000010644D (2003).

Internet Retailer, "The OmniChannel Issue", digitalcommerce360.com, v. 21, n. 2D (2019).

Kibo, "3 Priorities For Manufacturers To Build Direct-To-Consumer Sales" [online], retrieved on Mar. 27, 2020 from the Internet URL: https://kibocommerce.com/blog/3-priorities-manufacturers-direct-to-consumer/ (2018).

Lečić-Cvetković, Danica, et al., "An Algorithm for Customer Order Fulfillment in a Make-to-Stock Manufacturing System", Int. J. Computers, Communications & Control, v. 5, n. 5, pp. 783-791 (2010).

Lightwell, "IBM Watson Order Optimizer" [online], retrieved on Feb. 25, 2020 from the Internet URL: https://www.lightwellinc.com/solutions/supply-chain-management/order-optimizer/ (2019).

Witcher, Brendan, "Abolish Abandon Rates For In-Store Pickup", Forrester Research, Inc., Cambridge, Massachusetts (2016).

"Order Management & Fulfillment Solutions and Software", Lightwell, downloaded from the internet on Jul. 18, 2022, 20 pages, <https://lightwellinc.com/services-solutions/capabilities/order-management/>.

"Rakuten Ready—We're ready to help.", Rakuten Ready, downloaded from the internet on Jul. 18, 2022, 3 pages, <https://rakuten.us/rakutenready/>.

Mercer, Timothy, "3 Priorities For Manufacturers To Build Direct-To-Consumer Sales", Kibo, Apr. 19, 2018, 5 pages, <https://kibocommerce.com/blog/3-priorities-manufacturers-direct-to-consumer/>.

Witcher, Brendan, "Abolish Abandon Rates For In-Store Pickup", Forrester, May 5, 2016, 2 pages, <https://www.forrester.com/report/Abolish-Abandon-Rates-For-InStore-Pickup/RES133367>.

* cited by examiner

90

| Order # | First Name | Last Name | Username | Predicted time to pickup |
|---|---|---|---|---|
| 1 | Jane | Smith | @jsmit01 | 5 hours |
| 2 | Elliott | Muñoz | @elliottww | 2 hours |
| 3 | Kevin | Miller | @hellokv | 30 minutes |
| 4 | Todd | Brown | @tdbrown99 | 2 hours |
| 5 | Mary | Doe | @mardeeee | 15 minutes |

| BOPIS Priority | First Name | Last Name | Item(s) | Order # |
|---|---|---|---|---|
| 1 | Mary | Doe | phone charger | 5 |
| 2 | Kevin | Miller | plunger | 3 |
| 3 | Elliott | Muñoz | 3 pr. socks, lamp | 2 |
| 4 | Todd | Brown | toothbrush | 4 |
| 5 | Jane | Smith | corn flakes x3 | 1 |

*FIG. 5B* ns. If the system detects that
PRIORITIZING BOPIS ORDER FULFILLMENT

BACKGROUND OF THE INVENTION

Field of the Invention

The present invention generally relates to order fulfillment, and more particularly to a method of managing buy-online pickup-in-store orders.

Description of the Related Art

The Internet has introduced many changes for consumer spending, chief among these being online shopping, sometimes referred to as eCommerce. There are two common scenarios for online shopping. In one scenario, items purchased online are shipped from stores directly to the purchaser's home or place of business; in another scenario, items purchased online are picked up in stores by online shoppers. Many retailers with physical stores (brick-and-mortar) have added buy-online pickup-in-store (BOPIS) capability in their stores (sometimes referred to as "click and collect"). Retailers can offer BOPIS service to their customers and can get additional benefits such as inventory optimization and fewer returns, while avoiding delivery charges.

For buying online and picking up in store, a seller commits to an online shopper that an item purchased online is ready to be picked up in a specific store and at a specific time. A customer can place an order through any channel and later arrive at a store to pick up products. A store associate can keep the products ready at a kiosk at the front of the store to enable a pickup recipient or gift recipient to pick up the products on arrival at the store. When the shopper arrives at the store to collect the products in an order, the associate can identify the person at the store front and the shopper can provide verification details. Alternatively, the product may be placed in a secure locker with a code given to the customer that allows access to the locker without requiring assistance of the store associate. Once the product has been picked up, the associate can make a corresponding entry in the store's order system indicating that the product has actually been picked up, i.e., the sale has been completed.

SUMMARY OF THE INVENTION

The present invention in at least one embodiment is generally directed to a method of prioritizing buy-online pickup-in-store (BOPIS) order fulfillment for a physical store having an online presence by receiving BOPIS orders having respective order details from different users, retrieving profiles associated with the users, estimating order pickup times for the BOPIS orders based on the user profiles and the order details, ranking the BOPIS orders based on the estimated pickup times, and prioritizing fulfillment of the BOPIS orders according to the ranking. In the illustrative implementation the order details include product properties for the products in the different orders, one or more characteristics of the physical store, and an order velocity indicative of an urgency of a user in placing a particular BOPIS order. The order pickup times can be estimated by a cognitive system trained with input samples comprised of historical BOPIS orders respectively associated with actual pickup delays. The user profiles can include historical information regarding previous BOPIS orders from a given user including a percentage of previous BOPIS orders actually picked up, and an average pickup delay for the previous BOPIS orders that were picked up. If the system detects that any order pickup time is less than a predefined threshold, it can notify the store of the order pickup time with a warning that it is urgent.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIGS. 5A and 5B are tables showing multiple BOPIS orders entered in a time-order and corresponding prioritization of those orders in accordance with one implementation of the present invention.

The use of the same reference symbols in different drawings indicates similar or identical items.

DESCRIPTION OF THE PREFERRED EMBODIMENT(S)

BOPIS ordering has greatly enhanced online shopping capabilities for stores as well as offering more flexibility to customers, but given the recent surge of BOPIS orders placed, retailers are often left scrambling to implement efficient processes to fulfill those orders. In most cases, a store associate's job is not only picking and packing BOPIS orders, so for high-demand situations BOPIS order fulfillment can present a stressful work environment. A high churn rate of store associates can also lead to inefficiencies further exacerbating BOPIS fulfillment times. These problems, paired with the sheer increase in the number of shoppers trying BOPIS, necessitate a way for the retailers to better manage the manner in which orders are fulfilled.

It would, therefore, be desirable to devise an improved method of handling large numbers of BOPIS orders. It would be further advantageous if the method could efficiently prioritize pickup preparations for BOPIS orders which could take into account a wide variety of factors relating to the order. These and other advantages are achieved in various implementations of the present invention by improving upon the process of which BOPIS order is fulfilled first (second, third, etc.) based on customer profiles. A customer profile can include factual information about a customer such as principal location, real-time location (e.g., from GPS coordinates, cellular tower triangulation, micro-location data, etc.) as well as historical data pertaining to BOPIS orders and pickups, and other information such as demographics. The prioritization process can also be based on other factors relating to details of the orders. Those details can for example include store location, product condition, and an inferred urgency of the order (order velocity).

The method of the present invention for facilitating online shopping and customers' interaction with retail associates can be carried out in a cloud computing infrastructure. A routing and fulfillment server is coupled to multiple customers' and retail associates' electronic communication devices over a cloud-based network. The customers and retail associates exchange request and response message data with the server, during the process of communication. A customer initiates a transaction request message, intending to buy a product, specifying the product's attributes and a preferred delivery option for the product. In one aspect of the present invention, the routing and fulfillment server utilizes the transaction request message, a set of routing rules, and stored data, to select a specific retail store or distribution center to source the product from, and further selects an available retail associate located therein to serve the transaction.

Figure 1:
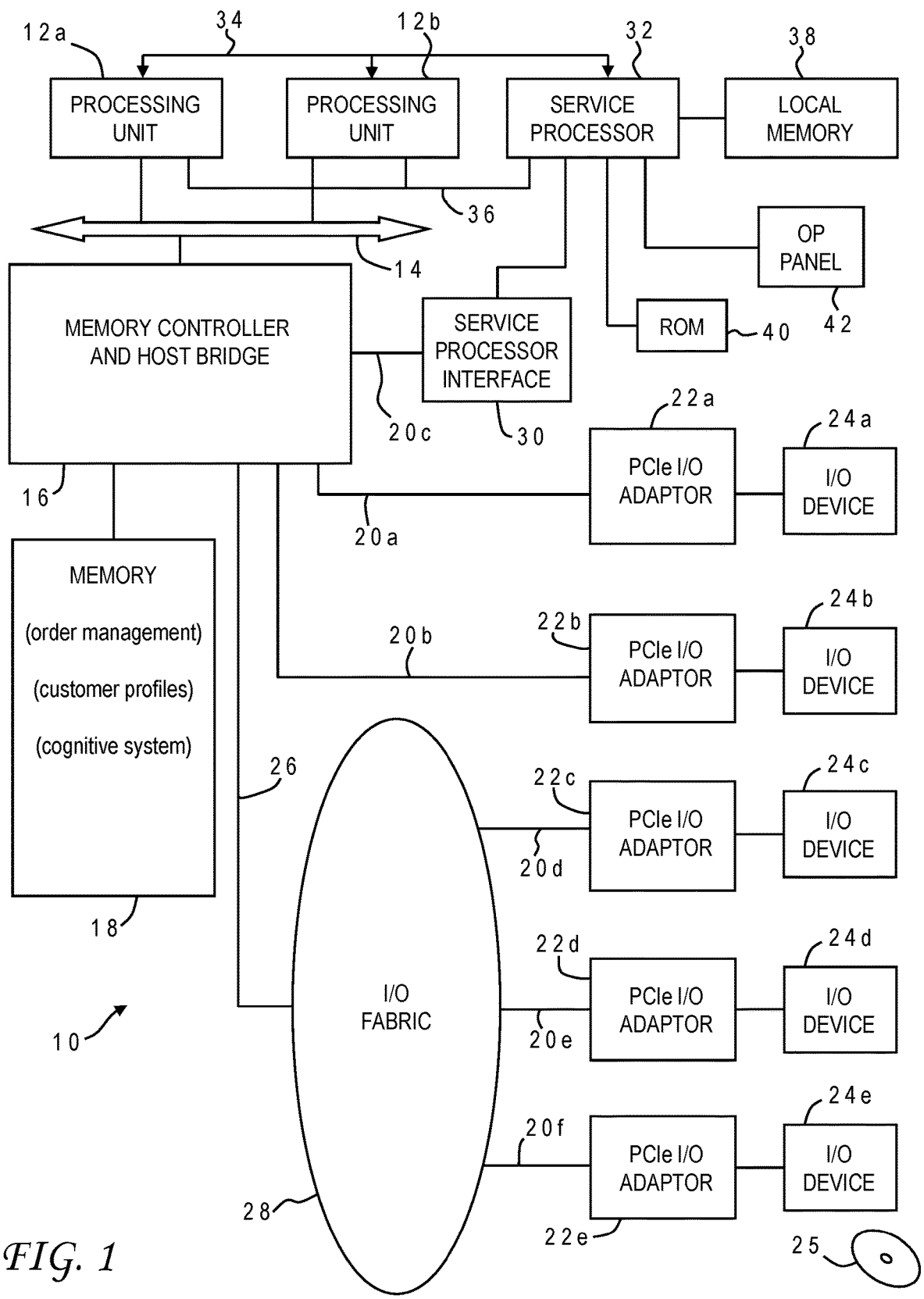
FIG. 1 is a block diagram of a computer system programmed to carry out BOPIS order prioritization in accordance with one implementation of the present invention.

With reference now to the figures, and in particular with reference to FIG. 1, there is depicted one embodiment 10 of a computer system in which the present invention may be implemented to carry out advanced prioritization of BOPIS orders. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, including order management software, customer profiles, and a cognitive system.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the BOPIS order prioritization application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a BOPIS order management process that uses novel analytical techniques to prioritize and optimize BOPIS orders. Accordingly, a program embodying the invention may additionally include conventional aspects of various BOPIS order management tools, and these details will become apparent to those skilled in the art upon reference to this disclosure. The nature of this disclosure revolves around the fact that the aforementioned problems were not existent before the invention of computers and the Internet. The present invention is therefore rooted in improving the technology of computers itself.

Figure 2:
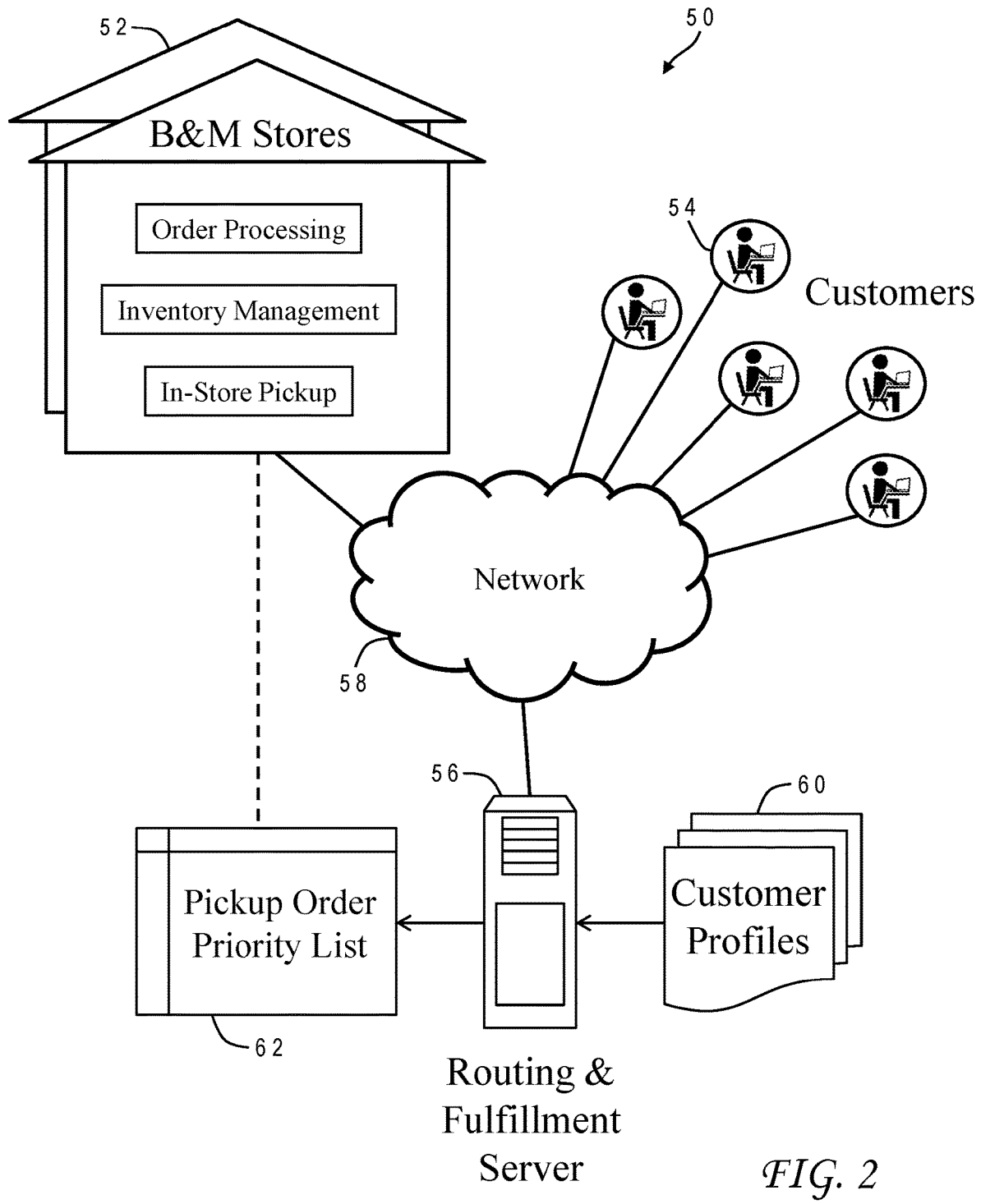
FIG. 2 is a pictorial representation of a BOPIS order system in accordance with one implementation of the present invention including a brick-and-mortar store, multiple customers, and a cloud server all of which can communicate over a network.

Referring now to FIG. 2, there is depicted a BOPIS order system in accordance with one implementation of the present invention including one or more brick-and-mortar (B&M) stores 52, multiple customers 54, and a routing and fulfillment server 56, all of which communicate over a network 58 such as the Internet. "Brick-and-mortar" as used herein merely denotes that the store is more that a virtual presence on the Internet, i.e., it has a physical presence and can be visited in-person by customers, but is otherwise not limiting. For example, the store could be a traditional retail front or could be a warehouse that is designed only for pickups with no shopping allowed. A computer system associated with a given B&M store 52 (such as computer system 10 of FIG. 1) helps manage the BOPIS orders from customers 54 using an order processing module, an inventory management module, and an in-store pickup module. The B&M computer system may be local to the store or may be remote, such as another server available via network 58.

The customer may interface with the order processing module by any convenient means such as a desktop or laptop computer, or a mobile computing device such as a cellphone. Items desired by the online shopper can be placed in a virtual cart and confirmed through a checkout process as conventionally known. The order processing module communicates with the inventory management module which verifies that an ordered product is indeed in the store's inventory. An order confirmation from the order processing module sent to customer 54 via network 58 can reflect an earliest pickup time and provide additional information such as a confirmation code to facilitate pickup. The product is then moved from its normal inventory location to an in-store pickup location. The placement of the product for pickup may be performed manually by a store associate or in an automated fashion using conventional equipment which locates the product in inventory, grabs it, and carries it to the front of the store. The in-store pickup can be at a manned kiosk of the store, or a secure locker, or simply held at a storefront counter. When the product is picked up by the customer, a pickup confirmation is generated by the in-store pickup module. In this manner BOPIS system 50 is aware of whether or not the product has been picked up at any given time.

The order processing module can provide order details to routing and fulfillment server 56. In the illustrative implementation routing and fulfillment server 56 is a cloud-based server. A cloud computing environment is service oriented with a focus on statelessness, low coupling, modularity, and semantic interoperability. At the heart of cloud computing is an infrastructure that includes a network of interconnected nodes, such as that provided by network 58. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

BOPIS orders from one or more B&M stores 52 are collected at routing and fulfillment server 56, which prioritizes them. An order can include ancillary data besides the product itself, such as identifying information pertaining to the customer, particulars of the store (e.g., location and hours of operation), and any properties of the product (e.g., perishable or medical). Some of this data may be stored and periodically updated at routing and fulfillment server 56 rather than being provided as part of the order. Routing and fulfillment server 56 utilizes the order data along with a profile 60 associated with the customer to predict a most likely pickup time for a specific order according to different implementations of the present invention. While the pickup time prediction may be rules-based, in the preferred embodiment it is a combination of rules and cognitive analysis. As explained below in conjunction with FIG. 4, a cognitive system running on routing and fulfillment server 56 examines various order-related data and computes a likely pickup delay for the order, i.e., the period of time from confirmation of the order to physical pickup of the product(s) at the store. This pickup delay is used to compute an estimated pickup time. Different orders are then ranked (sorted) according to their respective pickup times. In this manner, an order placed more recently may be given priority over an order that was placed earlier but whose estimated pickup time is later.

Routing and fulfillment server 56 thereby generates a pickup order priority list 62 which is provided to the store associate. The associate can then take the necessary steps to prepare in-store pickup for the highest priority orders first. This prioritization queue allows associates fulfilling BOPIS orders to optimize their workflow. Routing and fulfillment server 56 can update pickup order priority list 62 periodically, as well as each time a new order is received. The priority rank of a given order can thus dynamically change. If an order's estimated pickup time falls below some predefined threshold (e.g., 15 minutes), the system can issue an alert to the associate warning them that the pickup is imminent so they can proactively attend to fulfilling the order.

In some implementations, some or all of the prioritization functionality can be performed at the store itself with a local computing system. For example, routing and fulfillment server 56 could generate the estimated pickup times for each order and pass them on to a store system which could generate the pickup order priority list.

Figure 3:
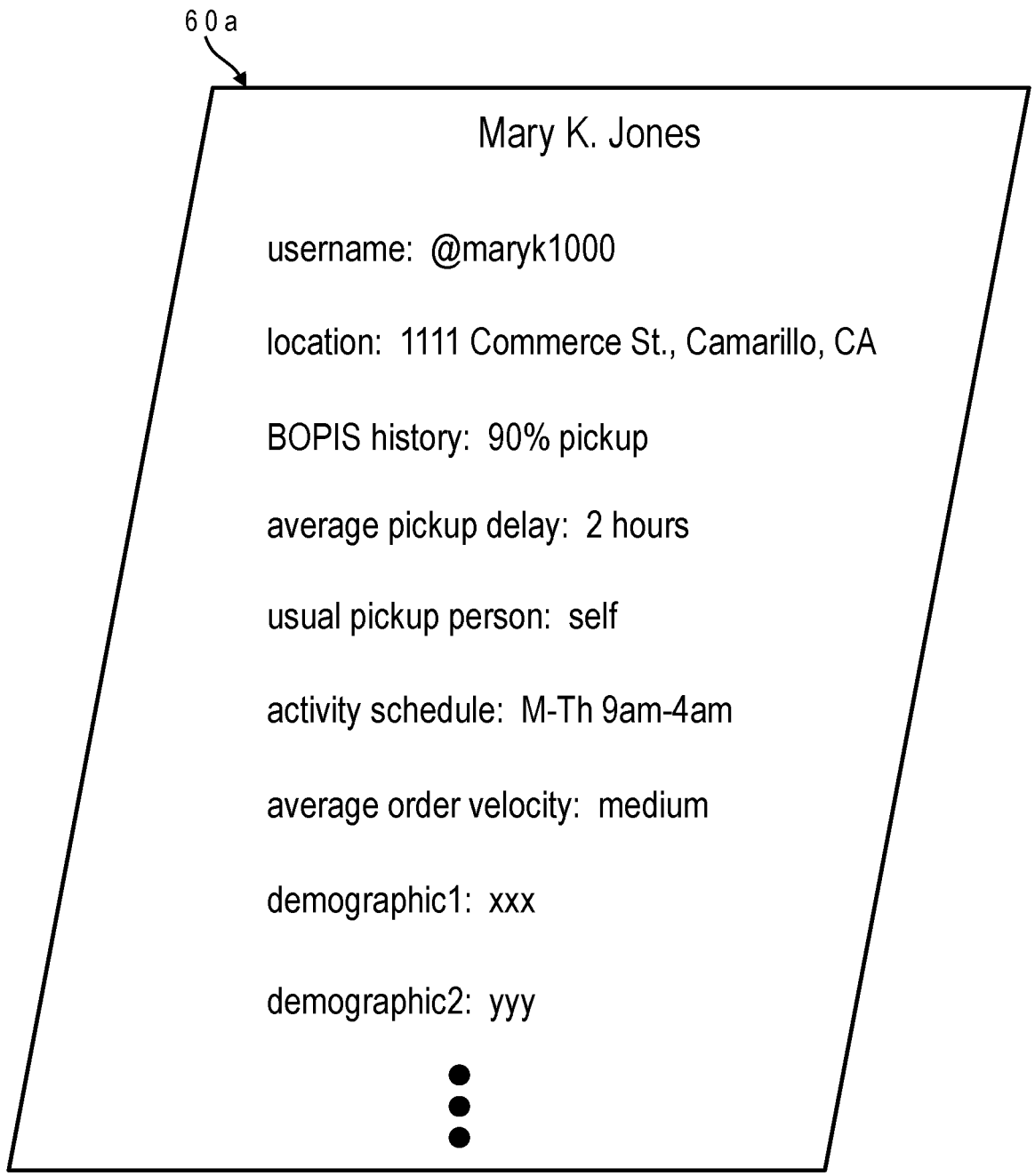
FIG. 3 is a sample profile for a customer which can be used to predict when a BOPIS order is likely to be picked up in accordance with one implementation of the present invention.

Whether the estimated pickup time is rules-based or based on cognitive analysis, it can rely on historical information pertaining to previous BOPIS orders made by the particular customer, as well as other customer information that might bear on the pickup delay. In some implementations of the present invention, this historical information is collected over time to build a unique profile for a given customer. If there is no profile built yet for the customer, it can be generated in real-time (i.e., while the BOPIS order is pending), or a default profile can be used. FIG. 3 shows one example 60a of such a profile for customer Mary K. Jones. The profile can include a unique identifier or username for each customer, as well as background information such as the customer's physical address. Profile 60a additionally contains historical pickup information for this customer. The historical pickup information can vary considerably depending on implementation and designer constraints. In the illustrative implementation, the historical pickup information includes the percentage of orders actually picked up after BOPIS was placed, an average pickup delay for previous BOPIS orders from this customer that were picked up, and the person who did the actual pickups, e.g., the customer themselves versus a friend/family or a third-party delivery service. The time period for the pickup delay may be expressed in any convenient form, e.g., hours and/or minutes.

Profile 60a may further include other information pertaining to the customer that is unrelated to historical pickup information. For example, profile 60a could include an activity schedule for the customer, demographic data such as age or gender, and the average urgency inferred for previous orders by this customer, referred to herein as order velocity. Order velocity pertains to determining customer intent in making a particular BOPIS order, and is gleaned from characteristics of the customer's interaction with the order processing system in placing an order. This interaction can include, among other things, how much time was spent viewing items at the store's online presence, how quickly was the checkout process completed, the total number of items placed in cart, previous views of items that eventually were purchased, the time it took from getting the customer's first item in cart until checkout completion, and how pointed the mouse clicks were. As a simple example, if a shopper spends very little time finding just one item to add to their online shopping cart, goes directly to checkout, using a minimum number of mouse actions to complete the order, it can be inferred that the order is very urgent. On the other hand, if a shopper takes a long time looking at many possible purchases, moves slowly through checkout, and purchases several items, the urgency might be considered very low.

Figure 4:
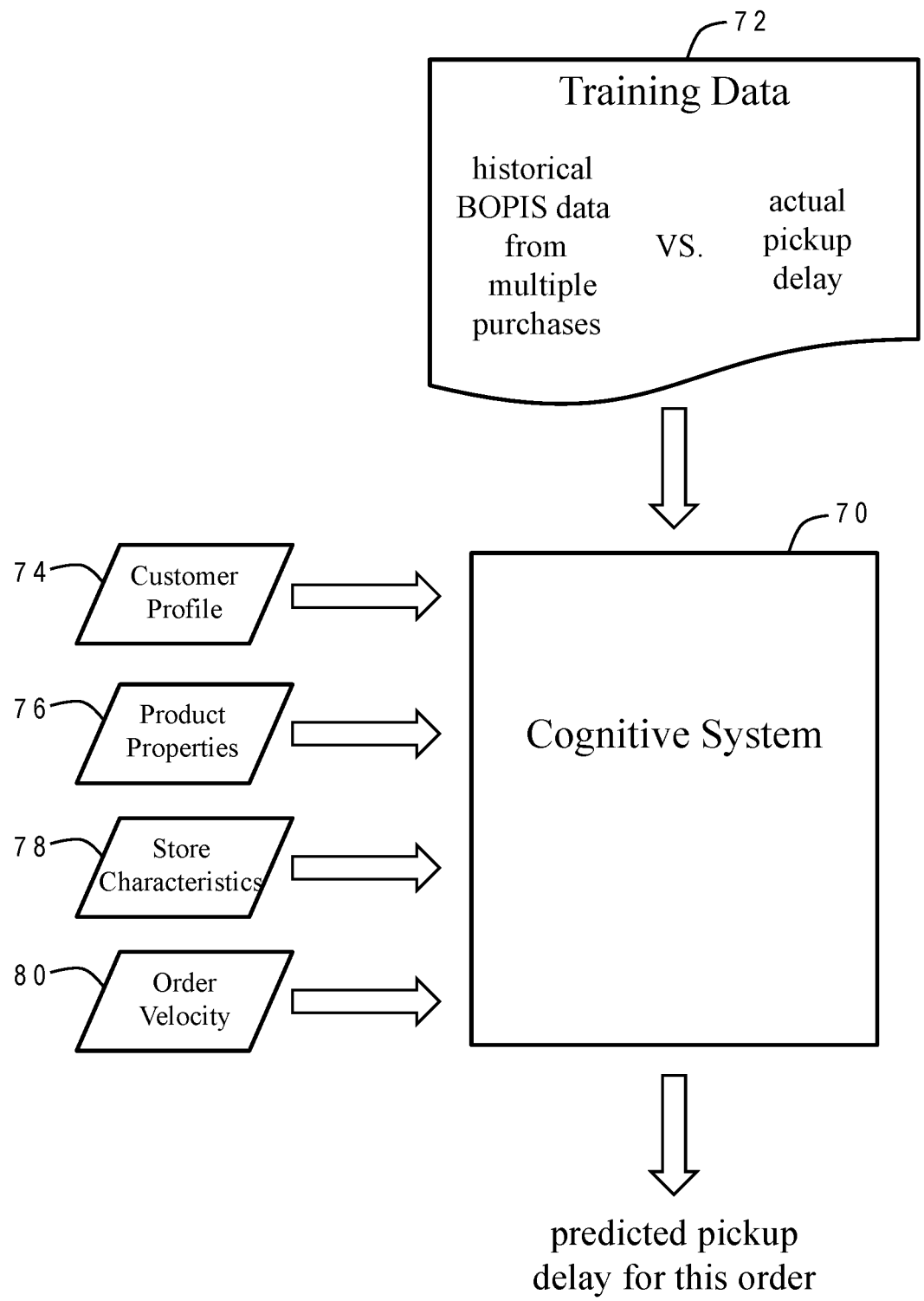
FIG. 4 is a block diagram of a cognitive system used to predict a likely pickup time for a BOPIS order using the system of FIG. 2 in accordance with one implementation of the present invention.

All of the information from the customer profile along with order details as well as real-time data can go into the analysis of determining the estimated pickup time for an order. FIG. 4 shows how a cognitive system 70 may be trained for this purpose in accordance with one implementation of the present invention. Cognitive system 70 is prepared using training data 72 from previous BOPIS orders of multiple customers and multiple stores; a given cognitive system might be tailored to a specific store or store-type (e.g. hardware store versus apparel store) using BOPIS data from only that store or stores of that type. Training data 72 includes a large number of input samples or pairs, one for each BOPIS order, the input pair comprising the given BOPIS order data and the associated pickup delay for that order, i.e., how much time it took to actually pickup the order after confirmation. The BOPIS order training data can include the information previously alluded to as part of the customer profile such as historical pickup information for a given customer, background information for the given customer, and demographic information for the given customer.

Once so trained, cognitive system 70 is able to predict a pickup delay for a current order based on various information associated with the current order. In the illustrative implementation, this information includes data from the customer profile 74, properties of the product(s) ordered 76, any relevant store characteristics 78, and the order velocity 80 for this order. Properties of the product may indicate that it is considered more urgent relative to other products. For example, perishable products (e.g., fruit or vegetable produce) is likely to be picked up sooner rather than later. A laptop charger may be considered slightly more urgent since a customer's existing charger might have stopped working, particularly compared to a package of toothpicks. Medical, pharmaceutical or first-aid products might all be deemed high urgency. Another property of the product may be its brand, or a class of similar products. Store characteristics can include those previously mentioned such as location and store hours of operation. Location is relevant not only vis-à-vis the customer's location (i.e., proximity to the store), but also for other reasons. For example, it may provide insight as to nearby traffic patterns, and can also be used to identify characteristics of other customers who are in the vicinity.

If available, the system can additionally take into account various real-time information. This can include information regarding the shopper based on monitoring of Internet-of-Things (IoT) devices such as smartphones, motorized vehicles, or navigation systems. This information can be further correlated with other real-time data such as site activity patterns, store traffic, calendar information, etc. This application of predicting pickup for a BOPIS order is a great use case for a machine learning system that can take these different data points and leverage past order data to make the best possible determination of pickup times, and this approach is seen as much more accurate long-term compared to a naïve rules engine. For example, monitoring of the IoT devices may indicated that the shopper is mobile (i.e., driving in a car) and happens to be headed towards the store, in which case the estimated pickup time can be updated to an earlier time that previously estimated. Also, the user profile might take into consideration whether the user delegates the pickup on their behalf to a third party and using the third party historical data to augment the user's profile. For example, a user may usually pick up within twenty minutes, but has delegated the pickup to a local delivery service that usually takes two hours to pick up. So the system would likely predict closer to a two hour pickup rather than the user's typical twenty minutes. Cognitive system 70 can also be updated regularly as new orders are fulfilled.

FIGS. 5A and 5B illustrate a simplified example for prioritizing BOPIS orders. Table 90 in FIG. 5A shows a series of orders as they were entered according to the time of order confirmation, with pickup times estimated by the predictive system relative to the current time. The first order by Jane Smith (for three boxes of corn flakes) has a predicted pickup time of five hours. The second order by Elliott Munoz (for three pairs of socks and a lamp) has a predicted pickup time of two hours. The third order by Kevin Miller (for a plunger) has a predicted pickup time of thirty minutes. The fourth order by Todd Brown (for a toothbrush) has a predicted pickup time of two hours. The fifth order by Mary Doe (for a phone charger) has a predicted pickup time of fifteen minutes which is the shortest estimated pickup time among all five of these orders. Mary might be deemed as more likely to retrieve her product sooner than the others for a variety of reasons that influence the cognitive analysis. For example, her historical pickup times may be fairly short, real-time monitoring may indicate that she is closer to the store than someone else having a short pickup time (like Kevin), she may have placed her order with a high order velocity indicating a dire need, the product itself has a property associated with somewhat increased urgency, and her activity schedule might indicate that she is currently active. Sorting these orders yields a priority ranking of Mary, Kevin, Elliott, Todd and Jane as seen in the table 92 of FIG. 5B. Thus, Mary's order will be prepared for pickup by the store associate first, even though her order was placed last in time. Elliott and Todd have the same estimated pickup times (a tie), so the ranking from the input time of the order is maintained, i.e., since Elliott placed his order earlier, it will be picked and packed before Todd's. The system subsequently learns that Mary did in fact come pick up her order faster than the others and attributes that to her customer profile, using it for future orders of similar profiles.

Figure 6:
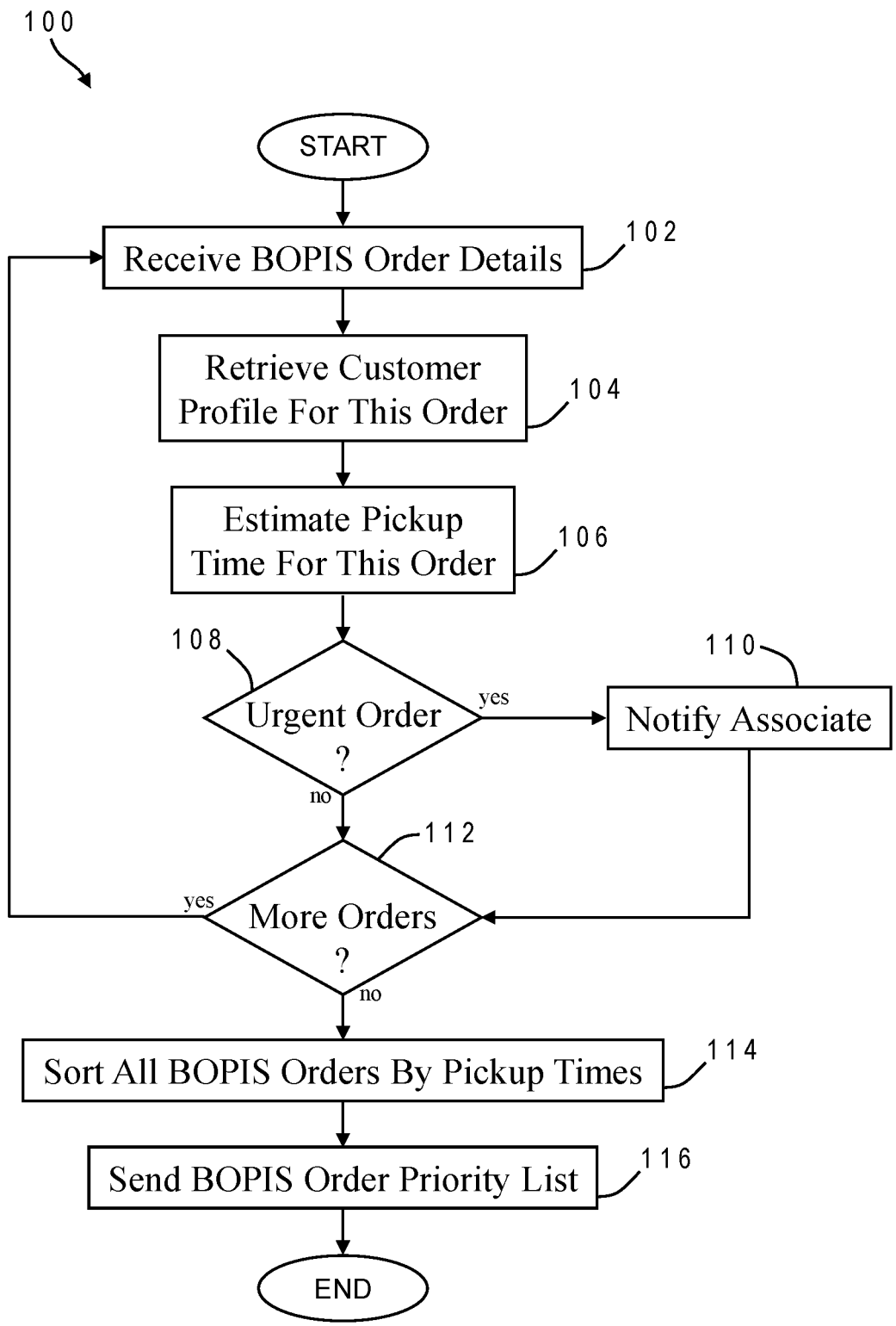
FIG. 6 is a flow illustrating the logical flow for a BOPIS order prioritization process in accordance with one implementation of the present invention.

The present invention may be further understood by reference to FIG. 6 which is a chart illustrating the logical flow for a BOPIS order prioritization process 100 in accordance with one implementation of the present invention. Process 100, which can be carried out using computer system 10, begins by receiving a current BOPIS order from a customer 102. The customer can place a BOPIS order on an eCommerce website just like they would today. The order can be tied to a particular brick-and-mortar store physically close to the customer, or may be open-ended allowing the BOPIS system to select the optimum store location. The order includes customer information (such as a customer ID) and order information pertaining to the product. The predictive system retrieves the customer profile associated with this customer ID 104 and leverages it (possibly along with other order information and real-time data) to estimate a pickup time for this order 106. As previously noted, computation of the pickup time can be totally rules-based, totally cognitive-based, or some combination of cognitive analysis and rules. Each rule may realistically contribute more or less to the end decision in different scenarios, at different times, and at different retailers. For example, a retailer that sells holiday gifts may experience shorter order pickup timeframes during the holiday season due to high demand, whereas an auto parts shop may not experience any noticeable spikes or dips in that regard. Other dynamic business rules can be set by the eCommerce retailer as desired. For example, the store may have determined that a BOPIS order has likely been abandoned by the customer; see copending application Ser. No. 16/585,423. In such a case, the order can be placed at the bottom of the priority list.

Returning to FIG. 6, if the estimated pickup time for the current order is urgent 108 (i.e., less than some threshold time period), the store associate is notified with an appropriate warning 110. If there are more pending BOPIS orders 112, process 100 repeats iteratively at box 102, computing pickup times for all of the orders. Once pickup times are estimated for all pending orders, they are sorted 114, and the BOPIS order priority list can be sent to the store 116.

The present invention thereby offers a superior solution for managing high-volume BOPIS orders, which is particularly helpful to the retail industry in competing with the proliferation of online shopping services. The improved prioritization provided by the present invention helps satisfy increasing consumer expectations for a broad array of order fulfillment options in online shopping. Optimizing handling of the BOPIS orders in this manner also helps stores maximize associate potential as well as retain key associates. Those implementations utilizing a cognitive system are able to leverage existing information to achieve pickup time predictions that are even more accurate.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while this approach has been described as optimizing stores and store associates, it can also be applied to any scenario that requires picking and packing for someone on a schedule (i.e., warehouses, boutiques, etc.). It is therefore contemplated that such modifications can be made without departing from the spirit or scope of the present invention as defined in the appended claims.

What is claimed is:

1. A method of prioritizing buy-online pickup-in-store (BOPIS) order fulfillment for a physical store having an online presence comprising:

receiving, by a cognitive system associated with a server, a plurality of input samples, each sample of the input sample comprising an input pair including BOPIS order data and a pickup delay associated with the order, wherein the cognitive system is trained using the plurality of input samples;

receiving, by the server, a first BOPIS order from a first user via an order processing module connected to a network, the first BOPIS order having first order details;

retrieving, by the server, a first user profile comprising historical user data including an actual pickup delay of the first user and a real-time location associated with the first user, wherein the real-time location is determined based upon at least one of GPS coordinates, cellular tower triangulation, or micro-location data;

receiving, by the server, a second BOPIS order from a second user via the order processing module after receiving the first BOPIS order, the second BOPIS order having second order details;

retrieving, by the server, a second user profile associated with the second user, the second user profile comprising historical user data of the second user and a real-time location associated with the second user;

estimating, by the trained cognitive system associated with the server, a first pickup time for the BOPIS order based on the first user profile and the first order details;

estimating, by the trained cognitive system associated with the server, a second order pickup time for the second BOPIS order based on the second user profile and the second order details generating, by the server, a pickup order priority list comprising the first BOPIS order and the second BOPIS order based on the first order pickup time and the second order pickup time, wherein the first BOPIS order is initially prioritized over the second BOPIS order;

providing, by the server, the pickup order priority list to a computing device associated with a store associate of the physical store;

monitoring, by the server, one or more devices associated with the first user or the second user and, based on the monitoring, detecting a change in real-time information associated with the first user;

responsive to detecting the change in real-time information, reprioritizing, by the server, the pickup order priority list, wherein the second BOPIS order is prioritized over the first BOPIS order;

providing, by the server, the reprioritized pickup order priority list to the computing device associated with a store associate of the physical store.

2. The method of claim 1 wherein the first BOPIS order is for a product having one or more product properties, and the first order details include the product properties.

3. The method of claim 1 wherein the first order details include one or more characteristics of the physical store.

4. The method of claim 1 wherein the first order details include an order velocity indicative of an urgency of the first user in placing the first BOPIS order.

5. The method of claim 1 further comprising receiving an updated location of the first user indicating proximity to the physical store and responsively modifying the first order pickup time.

6. The method of claim 1 further comprising:

detecting that the second order pickup time is less than a predefined threshold; and notifying the physical store of the second order pickup time with a warning that the second BOPIS order is urgent.

7. A computer system comprising:

one or more processors which process program instructions;

a memory device connected to said one or more processors; and program instructions residing in said memory device for prioritizing buy-online pickup in-store (BOPIS) order fulfillment for a physical store having an online presence by:

receiving, by a cognitive system associated with a server, a plurality of input samples, each sample of the input sample comprising an input pair including BOPIS order data and a pickup delay associated with the order, wherein the cognitive system is trained using the plurality of input samples;

receiving, via an order processing module connected to a network, a first BOPIS order from a first user having first order details;

retrieving, by the server, a first user profile comprising historical user data including an actual pickup delay of the first user and a real-time location associated with the first user, wherein the real-time location is determined based upon at least one of GPS coordinates, cellular tower triangulation, or micro-location data;

receiving, via the order processing module connected to the network, a second BOPIS order from a second user after receiving the first BOPIS order having second order details;

retrieving, by the server, a second user profile associated with the second user, the second user profile comprising historical user data of the second user and a real-time location associated with the second user;

estimating, by the trained cognitive system associated with the server, a first pickup time for the BOPIS order based on the first user profile and the first order details;

estimating, by the trained cognitive system associated with the server, a second order pickup time for the second BOPIS order based on the second user profile and the second order details;

generating, by the server, a pickup order priority list comprising the first BOPIS order and the second BOPIS order based on the first order pickup time and the second order pickup time, wherein the first BOPIS order is initially prioritized over the second BOPIS order;

providing, by the server, the pickup order priority list to a computing device associated with a store associate of the physical store;

monitoring, by the server, one or more devices associated with the first user or the second user and, based on the monitoring, detecting a change in real-time information associated with the first user;

responsive to detecting the change in real-time information, reprioritizing, by the server, the pickup order priority list, wherein the second BOPIS order is prioritized over the first BOPIS;

providing, by the server, the reprioritized pickup order priority list to the computing device associated with a store associate of the physical store.

8. The computer system of claim 7 wherein the first BOPIS order is for a product having one or more product properties, and the first order details include the product properties.

9. The computer system of claim 7 wherein the first order details include one or more characteristics of the physical store.

10. The computer system of claim 7 wherein the first order details include an order velocity indicative of an urgency of the first user in placing the first BOPIS order.

11. The computer system of claim 7 wherein the first user profile includes historical information regarding the previous BOPIS orders from the first user including a percentage of previous BOPIS orders actually picked up.

12. The computer system of claim 7 wherein said program instructions further detect that the second order pickup time is less than a predefined threshold, and notify the physical store of the second order pickup time with a warning that the second BOPIS order is urgent.

13. A computer program product comprising:
one or more computer readable storage media; and
program instructions collectively residing in said one or more computer readable storage media for prioritizing buy-online pickup-in-store (BOPIS) order fulfillment for a physical store having an online presence by:
receiving, by a cognitive system associated with a server, a plurality of input samples, each sample of the input sample comprising an input pair including BOPIS order data and a pickup delay associated with the order, wherein the cognitive system is trained using the plurality of input samples;
receiving, via an order processing module connected to a network, a first BOPIS order from a first user having first order details;
retrieving, by the server, a first user profile comprising historical user data including an actual pickup delay of the first user and a real-time location associated with the first user, wherein the real-time location is determined based upon at least one of GPS coordinates, cellular tower triangulation, or micro-location data;
receiving, via the order processing module connected to the network, a second BOPIS order from a second user after receiving the first BOPIS order having second order details;
retrieving, by the server, a second user profile associated with the second user, the second user profile comprising historical user data of the second user and a real-time location associated with the second user;
estimating, by the trained cognitive system associated with the server, a first pickup time for the BOPIS order based on the first user profile and the first order details;
estimating, by the trained cognitive system associated with the server, a second order pickup time for the second BOPIS order based on the second user profile and the second order details;
generating, by the server, a pickup order priority list comprising the first BOPIS order and the second BOPIS order based on the first order pickup time and the second order pickup time, wherein the first BOPIS order is initially prioritized over the second BOPIS order;
providing, by the server, the pickup order priority list to a computing device associated with a store associate of the physical store;
monitoring, by the server, one or more devices associated with the first user or the second user and, based on the monitoring, detecting a change in real-time information associated with the first user;
responsive to detecting the change in real-time information, reprioritizing, by the server, the pickup order priority list, wherein the second BOPIS order is prioritized over the first BOPIS order;
providing, by the server, the reprioritized pickup order priority list to the computing device associated with a store associate of the physical store.

14. The computer program product of claim 13 wherein the first BOPIS order is for a product having product properties, and the first order details include the product properties.

15. The computer program product of claim 13 wherein the first order details include one or more characteristics of the physical store.

16. The computer program product of claim 13 wherein the first order details include an order velocity indicative of an urgency of the first user in placing the first BOPIS order.

17. The computer program product of claim 13 wherein the first user profile includes historical information regarding the previous BOPIS orders from the first user including a percentage of previous BOPIS orders actually picked up.

\* \* \* \* \*